United States Patent
Condusta

Patent Number: 5,231,784
Date of Patent: Aug. 3, 1993

[54] FISHING DEVICE

[76] Inventor: James Condusta, 21 Coal St., Plymouth, Pa. 18651

[21] Appl. No.: 923,620

[22] Filed: Aug. 3, 1992

[51] Int. Cl.$^5$ ............................................. A01K 87/00
[52] U.S. Cl. ...................................... 43/19.2; 43/17
[58] Field of Search ........................ 43/19.2, 26.1, 17

[56] References Cited

U.S. PATENT DOCUMENTS

| | | | |
|---|---|---|---|
| 2,934,849 | 5/1960 | Kampa | 43/19.2 |
| 2,976,640 | 3/1961 | Sensenbrenner | 43/19.2 |
| 3,599,369 | 8/1971 | Carlson | 43/19.2 |
| 4,033,062 | 7/1977 | Denecky | 43/19.2 |
| 4,253,262 | 3/1981 | Johnson | 43/17 |
| 4,373,287 | 2/1983 | Grahl | 43/19.2 |
| 4,567,686 | 2/1986 | Akom | 43/19.2 |

FOREIGN PATENT DOCUMENTS 465156 12/1975 U.S.S.R. ................... 43/19.2

Primary Examiner—Kurt C. Rowan
Attorney, Agent, or Firm—Michael J. Delaney

[57] ABSTRACT

A device suitable for ice fishing has a base supported above a hole in the ice. A horizontal shaft is rotatably attached to the base and has a wind driven fan at one end and a crank at the other end. A guide member is pivoted to the end of the crank and guides a fishing line wound on a reel with a bait hook in the water. When the fan rotates the shaft and crank, the guide member moves about its pivot point on the crank. This motion causes the hook to rise and fall and move horizontally in the water to attract a fish. The fishing device also has a spring strip having one end attached to the base and the outer end includes a curved portion and a flag. A stop plate is slidably mounted on the spring strip. The spring strip in the set position has the curved portion positioned in a notch on a plate attached to the base. A reel, upon which the fishing line is wound is rotatably attached to the base adjacent the notch and has a trip pin which rotates with the reel. When the fishing line is unwound from the reel by a fish taking the hook, the trip pin contacts the curved portion of the spring strip and forces the curved portion out of the notch. The spring strip then assumes a vertically extending position with the flag raised, thus showing that a fish has taken the bait hook. The stop plate slides down the spring strip and contacts the crank and stops further rotation of the fan.

5 Claims, 3 Drawing Sheets

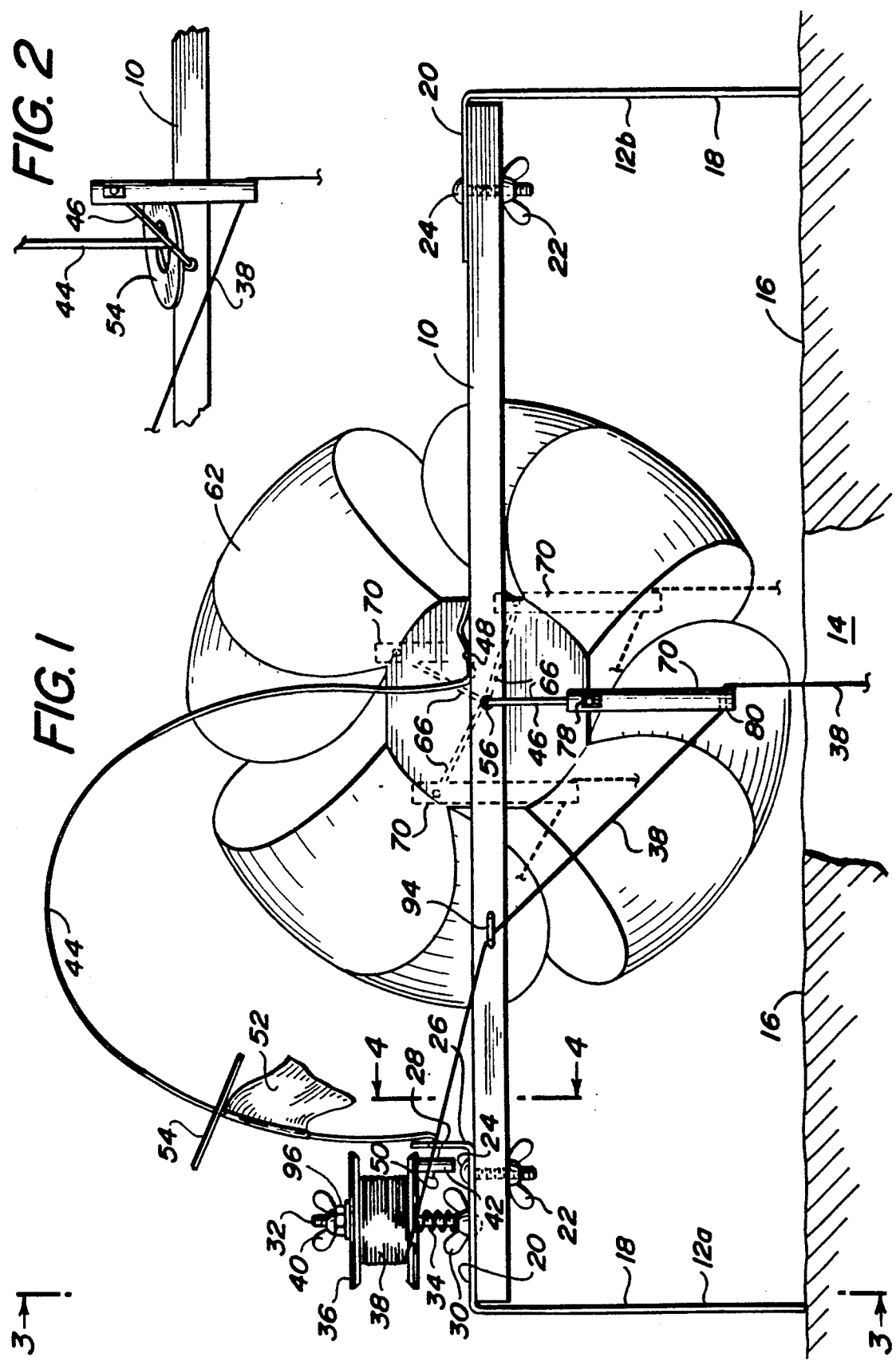

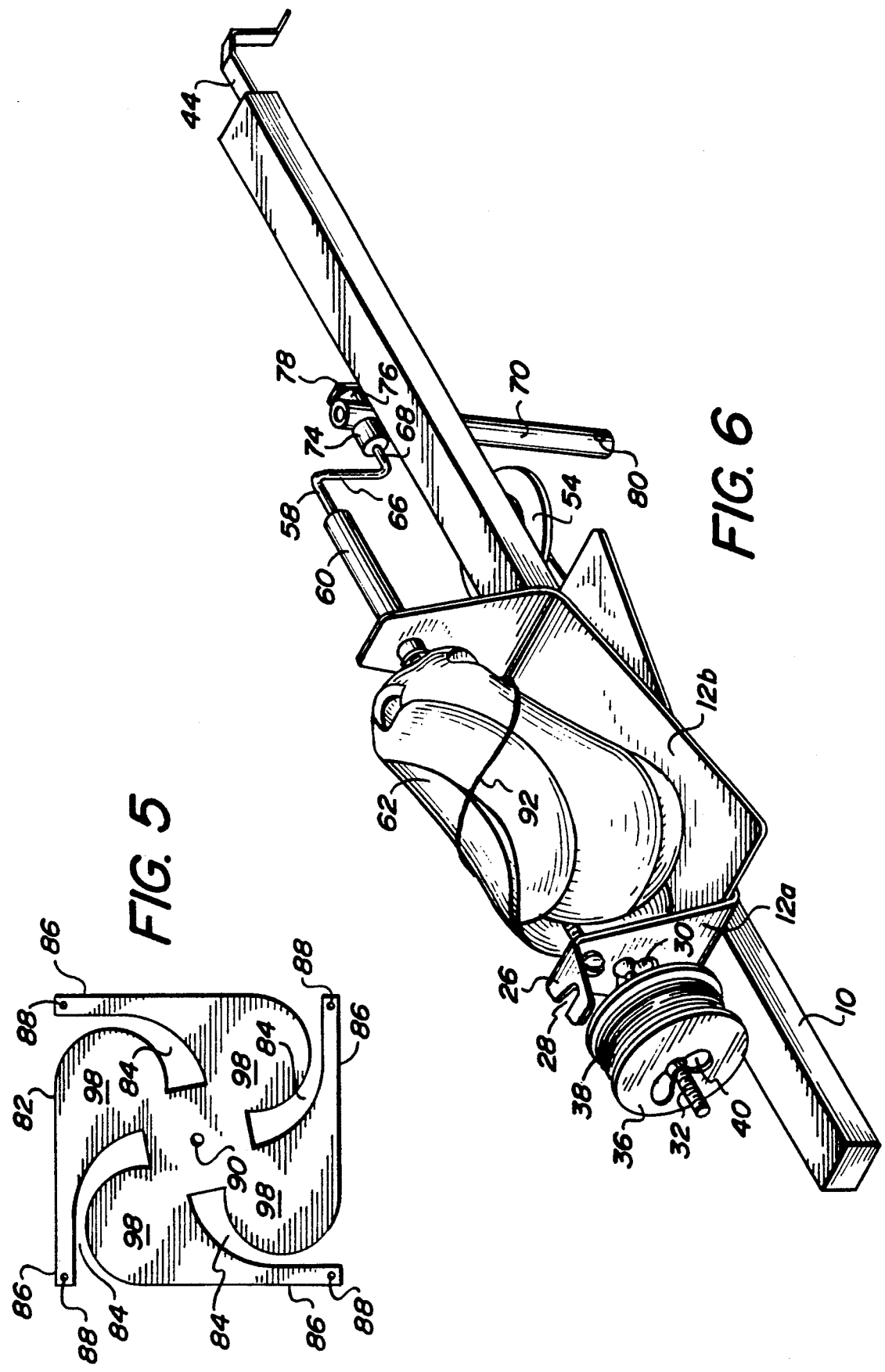

FISHING DEVICE

FIELD OF THE INVENTION

This invention relates to a fishing device and, in particular to a fishing device which automatically provides for the jigging movement of a fish hook in a body of water, a tip-up signalling flag and means to stop the jigging movement when the signalling flag is in the raised position.

BACKGROUND OF THE INVENTION

It is known in the prior art that a fishing device which provides for a jigging movement of a fish hook in a body of water is beneficial in the catching of fish. The prior art includes a number of arrangements to accomplish the jigging motion.

U.S. Pat. No. 4,642,930 discloses a fishing apparatus wherein an elongated member is balanced about a fulcrum and oscillates to a limited degree about the fulcrum to provide a jigging motion to a fish hook.

U.S. Pat. No. 2,934,849 discloses an ice fishing device including a vane which reacts to wind and imparts a jigging motion to a fish hook.

U.S. Pat. No. 2,643,478 discloses a fishing line agitator which includes a wind driven fan or a motor and gear/cam arrangement to provide jigging motion to a fish hook.

U.S. Pat. No. 3,599,369 discloses an ice fishing device which provides for jigging motion of a fish hook in a body of water by a wind driven fan and an arrangement of links, levers and springs in combination with a bell crank and flywheel.

The above prior art fishing devices for providing a jigging motion to a fish hook possess one or more of the following disadvantages: (1) The device is complicated and costly to make. (2) The device can not be readily modified to provide more or less jigging motion. (3) The device can not be readily disassembled for transportation to and from a fishing site. (4) The weight of the device is considerable and the device is bulky. (5) The device can not be readily modified to allow it to be used without a jigging motion if so desired. (6) The device can not be packaged in a neat compact manner. (7) The device is not provided with means to adjust the amount of force required to unwind fishing line from the reel.

SUMMARY OF THE INVENTION

It is an object of this invention to provide a fishing device suitable for ice fishing which includes a simple, inexpensive arrangement which automatically provides a jigging motion to a fish hook, that is, the fish hook is raised, lowered and moved horizontally in a body of water.

It is another object of this invention to provide a fishing device which allows the amount of jigging motion of the fish hook to be changed with a minimum amount of modification to the device.

It is a further object of this invention to provide a fishing device which includes a tip-up signalling flag and means to stop the jigging motion of the fish hook when the tip-up is triggered and the flag is raised.

It is a still further object of this invention to provide a fishing device which is easy to assemble and disassemble and may be neatly and compactly packaged for storage and transportation.

These objects can be accomplished by the fishing device of this invention comprising a base adapted to be supported above a body of water in a horizontally extending position. A horizontally extending shaft is rotatably attached to the base. Motor means is attached to one end of the shaft and a crank is attached to the other end. A guide member is pivotally attached to the free or outer end of the crank for guiding a fishing line which extends into a body of water and has a fish hook attached thereto. Rotation of the shaft and crank by the motor means causes the guide member to rock or pivot about the crank while causing the fish hook to be raised, lowered and moved horizontally. Thus this jigging motion of the fish hook attracts a fish to the fish hook. The device also includes a reel upon which the fishing line is wound. The reel has a trip pin attached to the reel. The trip pin and reel are positioned so that the trip pin moves in a path immediately adjacent to a plate attached to the base and having a notch therein. A spring strip has one end attached to the base directly above the crank. The other end of the spring strip has a curved portion at its very end and a signal flag next to the curved portion. The spring strip in the set position is bent downwardly from its normally vertically extending position and the curved portion is placed in the notch. When the fishing line is unwound from the reel, as by a fish taking the fish hook and moving away with it, the trip pin contacts the curved portion of the spring strip and moves it out of the notch and the spring strip and flag assume a raised position. At the same time a stop plate, which is slidably mounted on the spring strip and positioned next to the flag in the set position, slides down the spring strip and contacts the crank so as to stop further rotation of the crank. The shaft on which the rotatable reel rotates includes a threaded upper end and a compression spring upon which spring the reel rests about its lower end. A wing nut and a hex nut are in threaded engagement with the threaded upper end of the shaft and may be tightened or loosened about the threaded upper end so the force necessary to unwind fishing line from the reel may be varied.

BRIEF DESCRIPTION OF THE DRAWINGS

FIG. 1 is an elevational view of the fishing device of this invention.

FIG. 2 is a partial elevational view of the device showing the base, crank, fishing line, stop plate, spring strip and guide member of this invention.

FIG. 5 is a projection of the surface of a fan section in a flat pattern.

FIG. 6 is a perspective view of this invention in a disassembled, packaged mode.

DETAILED DESCRIPTION OF THE DRAWINGS

Figure 4:
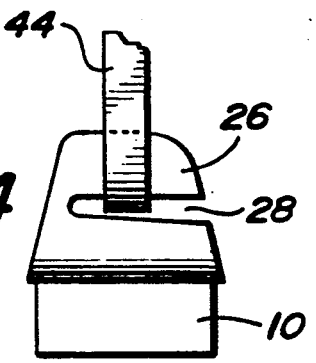
FIG. 4 is a view along the line 4—4 of FIG. 1.

Referring to FIG. 1, the fishing device comprises a horizontally extending base 10 having legs 12a, 12b attached thereto to support the device above a hole 14 in the ice 16 on a body of water. Each leg 12a, 12b has a downwardly extending portion 18 resting on the ice 16 and a horizontally extending portion 20 attached to the base 10 by a nut 22 and bolt 24. In addition leg 12a includes an integral plate 26 extending upwardly from the base 10 which plate 26 includes a horizontally extending notch 28, more clearly shown in FIG. 4. Attached to base 10 by wing nut 30 is a threaded bolt or shaft 32. Positioned above the wing nut 30 on the bolt 32 is a compression spring 34. Also positioned on the bolt 32 for rotation thereon is a reel 36 about which fishing line 38 is wound. Reel 36 rests on compression spring 34. A wing nut 40 and a hex nut 96 are in threaded engagement with the bolt 32 with the hex nut 96 bearing upon the upper surface of the reel 36. The wing nut 40 and hex nut 96 act as a locking arrangement to secure the reel 36 on the shaft 32. By rotation of the wing nut 40 and hex nut 96 on the bolt 32 more or less force is exerted on the reel 36 and the spring 34, thus varying the force necessary to rotate the reel 36. Extending downwardly from and secured to the reel 36 is a trip pin 42. When the reel 36 is rotated the trip pin 42 passes immediately adjacent to notch 28 in plate 26.

Figure 3:
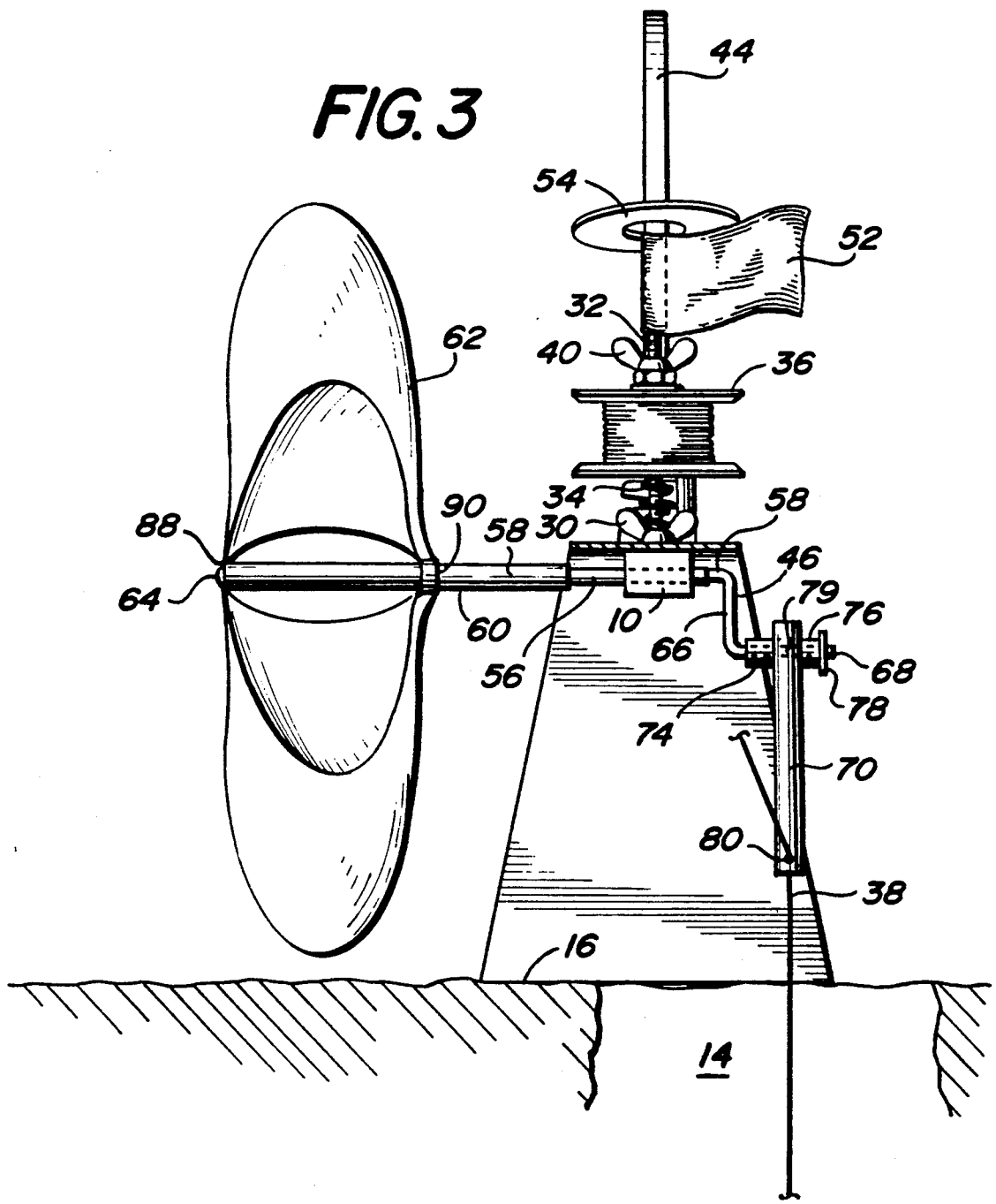
FIG. 3 is a view taken along the line 3—3 of FIG. 1.

Referring to FIG. 1, one end of spring strip 44 is attached to about the midpoint of the top of the horizontally extending base 10 adjacent the crank 46 by means of a staple 48. At said one end, the spring strip 44 is bent at about a right angle so that when said one end is bearing against the base 10, the portion of the spring strip 44 adjacent said one end extends upwardly from the base 10 at about a right angle. The other end of spring strip 44 has a hook or curved portion 50 which can be positioned in the notch 28 of plate 26 when the spring strip 44 is in the set position. See also FIG. 4. The spring strip 44 also has a signal flag 52 attached to it adjacent the curved portion 50. A stop plate 54 in the form of a circular washer as shown in FIGS. 1, 2 and 3 is slidably mounted on spring strip 44. FIGS. 1 and 3 show the stop plate 54 in the set position adjacent the flag 52, and FIG. 2 shows the stop plate 54 in the released position in contact with the crank 46 after the trip pin 42 of reel 36 has forced the curved portion 50 of the spring strip 44 out of the notch 28 and flag 52 has assumed a raised position.

Referring to FIG. 3, a bushing 56 extends through a horizontally extending hole in the base 10 and is a force fit in such hole. Passing through the bushing 56 and freely rotatable therein is a horizontally extending shaft 58. One end of the shaft 58 has a plastic sleeve 60 which is forced fitted onto the portion of the shaft 58 which extends through bushing 56. A wind driven fan 62 is secured to the sleeve 60 by a screw 64 which threads into the plastic sleeve 60. The other end of the shaft 58 has an integral crank 46 attached thereto. The crank 46 includes a downwardly extending portion 66 and a horizontally extending portion 68. Attached to the horizontally extending portion 68 of the crank 46 is guide member 70. The upper end of the guide member 70 is pivotally attached to the horizontally extending portion 68 of the crank 46 by means of a hole in the guide member 70 which loosely passes over the horizontally extending portion 68 of crank 46. The guide member 70 is positioned on the horizontally extending portion 68 between an inner spacer 74 and an outer spacer 76. Both spacers 74, 76 loosely fit on the horizontally extending portion 68 of the crank 46. A lock fastener 78 secured to the end of the horizontally extending portion 68 of the crank 46 retains the spacers 74, 76 and guide member 70 on the horizontally extending portion 68 of the crank 46. The lower end of the guide member 70 includes a hole 80 therein to allow the fishing line 38 to pass freely therethrough.

FIG. 5 is a flat pattern of one section 82 of the wind driven fan 62 of this invention. The fan 62 is made of two such fan sections 82. The material from which the fan sections 82 are made is a flexible plastic (Mylar) which can withstand low temperatures. The fan section 82 as shown in FIG. 5 has a square configuration with substantially c-shaped cut outs 84 beginning adjacent to each corner 86 and extending inwardly and stopping short of the center of the fan section 82. The fan section 82 includes holes 88 at each of the four corners 86 and a center hole 90. When the two fan sections 82 are mounted on horizontally extending plastic sleeve portion 60, see FIG. 3, of shaft 58 the holes 88 in the four corners 86 are held at the end of the sleeve portion 60 by screw 64 and the hole 90 in the center passes over the plastic sleeve portion 60 as shown in FIG. 3. In doing so the two fan 10 sections 82 are angularly offset from one another on the sleeve 60 by about 45 degrees. Each fan section 82 provides four curved vanes with the vanes formed from the portion generally indicated by numeral 98 on FIG. 5. Thus the two fan sections 82 provide 8 vanes for the fan 62.

FIG. 6 shows the fishing device of this invention disassembled and arranged in a neat compact package. In so doing the legs 12a, 12b and horizontally extending shaft 58 are removed from the base 10. The fan 62 is collapsed and held in the collapsed position by a rubber band, string or like means 92, between the leg portions 12a, 12b with the sleeve portion 60 passing through the holes in the legs 12a, 12b with the crank 46, spacers 74, 76 and guide member 70 secured thereto. The spring strip 44 with stop plate 54 mounted thereon is moved from its position shown in FIG. 1 by forcing the spring strip 44 through staple 48 so that the end of the spring strip 44 is in the position shown in FIG. 6. Threaded shaft 32 and wing nuts 40, 30 hold reel 36 with fishing line 38 to leg 12a.

In operation and with the fishing device in an assembled mode, referring to FIGS. 1 and 3, the base 10 is positioned over a hole 14 in the ice 16 of a body of water with the legs 12a, 12b resting on the ice 16 on opposite sides of the hole 14 and supporting the fishing device. The fishing line 38 is unwound from the reel 36 and passed through guide staple 94 in the side of the base 10 (See FIG. 1) and through the hole 80 in the lower end of the guide member 70 and with the fish hook (not shown) at the end of the fishing line 38 and suspended at the desired location in the body of water.

The device is then oriented so that the elongated base 10 extends perpendicular to the direction in which the wind is blowing and the fan 62 is placed on the windward side of the device. The spring strip 44 is bent downwardly and the curved portion 50 is placed within notch 28 of plate 26. Stop plate 54 is placed next to flag 52 as shown in FIG. 1.

As the wind blows and rotates the fan 62, the shaft 58 rotates and the crank 46 and vertical portion 66, and guide member 70 assume the various positions shown in dotted lines in FIG. 1. As the guide member 70 assumes these positions the fishing line 38 and fish hook is jigged, i.e., raised and lowered in the body of water while at the same time moving horizontally. The amount of upward, downward and horizontal movement of the fish hook is dependent on the length of the downwardly extending portion 66 of the crank 46. Thus the jigging motion can be varied by providing cranks 46 having vertically extending portions 66 of different lengths.

The speed at which the guide member 70 moves the fishing line 38 can also be varied by changing the orientation of the elongated base 10 with respect to the direction in which the wind is blowing. That is, to vary the speed of movement, the base 10 can be set at different angles with respect to the wind direction.

When a fish takes the fish hook (not shown), fishing line 38 is unwound from the reel 36 and the reel 36 rotates. When the reel 36 rotates to a position such that the trip pin 42 contacts the curved portion 50 of the spring strip 44, further rotation of the reel 36 forces the curved portion 50 out of the notch 28 and the spring strip 44 assumes the vertically extending position with the flag 52 raised to indicate a fish has taken the fish hook. As the spring strip 44 assumes a vertical position, stop plate 54 slides down the spring strip 44 and contacts the crank 46 and stops further rotation of the crank 46.

Thereafter the fisherman grasps the fishing line 38 and pulls in a fish attached to the fish hook.

Should the fisherman elect to not have the fishing device of this invention provide a jigging motion all the fisherman has to do is position the stop plate 54 in contact with the crank 46. The spring strip 44 and signal flag 52 can still be used as described above to signal the movement of the fishing line 38 even though no jigging motion is desired.

While I have described my invention in considerable detail I do not wish this invention to be narrowly construed in view of the amount of detail disclosed, but wish this invention to cover all modifications, substitutes and changes as are within the scope of the claims.

I claim:

1. A fishing device comprising
   (a) a substantially horizontally extending base adapted to be positioned on a supporting surface and above a body of water in which a fish hook attached to a fishing line is to be placed,
   (b) a substantially horizontally extending shaft rotatably attached to said substantially horizontally extending base for rotation about a horizontal axis,
   (c) motor means attached directly to one end of said substantially horizontally extending shaft and a crank directly attached to the other end of said substantially horizontally extending shaft, said crank consisting of a downwardly extending portion integral with and extending perpendicular to said horizontally extending shaft and a horizontally extending portion integral with and extending horizontally from said downwardly extending portion, and
   (d) a guide member depending from and pivotally attached to the free end of said horizontally extending portion of said crank for guiding said fishing line which passes freely through said guide member into said body of water, wherein rotation of said motor means causes said horizontally extending shaft and said crank to rotate and said guide member to rock about its pivot point with said horizontally extending portion of said crank and cause said fishing line and said fish hook to rise and fall while moving horizontally within said body of water.

2. A fishing device comprising
   (a) a substantially horizontally extending base adapted to be positioned on a supporting surface and above a body of water in which a fish hook attached to a fishing line is to be placed,
   (b) a substantially horizontally extending shaft rotatably attached to said substantially horizontally extending base,
   (c) motor means attached to one end of said substantially horizontally extending shaft and crank means attached to the other end of said substantially horizontally extending shaft, and
   (d) a guide member depending from and pivotally attached to the free end of said crank means for guiding said fishing line into said body of water, wherein rotation of said motor means causes said horizontally extending shaft and said crank means to rotate and said guide member to rock about its pivot point with said crank means and cause said fishing line and said fish hook to rise and fall while moving horizontally within said body of water, and
   (e) a rotatable reel mounted on said substantially horizontally extending base and having said fishing line wound thereon, a spring strip having one end attached to said base adjacent said horizontally extending shaft and the other end having a curved portion and a flag attached thereto immediately adjacent said curved portion, plate means attached to said base member adjacent said reel and having a notch therein, and a trip pin attached to said rotatable reel, wherein when said curved portion is positioned in said notch, rotation of said reel by fishing line being unwound from said reel causes said trip pin to force said curved portion out of said notch and said spring strip assumes a substantially vertically extending position to signal a fish having taken the fish hook and unwound fishing line from said reel.

3. The fishing device of claim 2 wherein said motor means comprises a wind driven fan made from a plastic material and having a plurality of curved vanes.

4. The fishing device of claim 3 wherein a stop plate is slidably mounted on said spring strip between said flag and said one end of said spring strip attached to said base and positioned adjacent said flag when said curved portion is positioned in said notch, wherein when said trip pin of said reel forces said curved portion out of said notch and said spring strip assumes a substantially vertically extending position said stop plate slides down said spring strip and contacts said crank means and prevents further rotation of said fan.

5. The fishing device of claim 4 wherein said rotatable reel rotates about a shaft extending upwardly from said base, a spring positioned about said shaft between said base and said reel, and a nut in threaded engagement with the upper end of said shaft and bearing on the upper surface of said reel, so that the force necessary to rotate said reel may be adjusted by rotation of said nut.

* * * * *